(12) United States Patent
Morley et al.

(10) Patent No.: US 10,158,579 B2
(45) Date of Patent: Dec. 18, 2018

(54) RESOURCE SILOS AT NETWORK-ACCESSIBLE SERVICES

(71) Applicant: Amazon Technologies, Inc., Reno, NV (US)

(72) Inventors: Adam Douglas Morley, Seattle, WA (US); Vincent Anthony Brancato, Seattle, WA (US); Stefano Stefani, Issaquah, WA (US); Jai Vasanth, Seattle, WA (US); Wei Xiao, Kirkland, WA (US); Maximiliano Maccanti, Bellevue, WA (US); Swaminathan Sivasubramanian, Seattle, WA (US); Rande A. Blackman, Seattle, WA (US); Timothy Andrew Rath, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 291 days.

(21) Appl. No.: 13/924,157

(22) Filed: Jun. 21, 2013

(65) Prior Publication Data

US 2014/0379921 A1 Dec. 25, 2014

(51) Int. Cl.
*H04L 12/911* (2013.01)
*H04L 12/24* (2006.01)
(Continued)

(52) U.S. Cl.
CPC ............ *H04L 47/70* (2013.01); *G06F 9/5027* (2013.01); *G06F 9/5061* (2013.01);
(Continued)

(58) Field of Classification Search
CPC ..... H04L 47/70; H04L 41/0893; H04L 67/10; G06F 9/5061; G06F 9/5027; G06F 11/2094
See application file for complete search history.

(56) References Cited

U.S. PATENT DOCUMENTS 7,716,180 B2   5/2010  Vermeulen et al.
7,756,830 B1 *  7/2010  Chao et al. ................... 707/638
(Continued)

OTHER PUBLICATIONS

Hive: Fault Containment for Shared Memory Multiprocessors, by John Chapin et. al. (ACM Symposium on Operating System Principles, 1995).*

(Continued)

*Primary Examiner* — John M Macilwinen
(74) *Attorney, Agent, or Firm* — Robert C. Kowert; Meyertons, Hood, Kivlin, Kowert & Goetzel, P.C.

(57) ABSTRACT

Methods and apparatus for resource silos at network-accessible services are disclosed. A subset of resources used for a database service, including at least one resource from each of a plurality of data centers, is selected for membership in a resource silo based on grouping criteria. A silo routing layer node identifies the resource silo as the target silo to which a client work request is to be directed. The client work request is sent to a front-end resource of the target silo either by the client, or by the silo routing layer node on behalf of the client. The front-end resource of the target silo transmits a representation of the work request to a back-end resource of the target silo, where a work operation corresponding to request is performed.

20 Claims, 9 Drawing Sheets

(51) Int. Cl.
  *H04L 29/08* (2006.01)
  *G06F 11/20* (2006.01)
  *G06F 9/50* (2006.01)

(52) U.S. Cl.
  CPC ...... *G06F 11/2094* (2013.01); *H04L 41/0893* (2013.01); *H04L 67/10* (2013.01)

(56) References Cited

U.S. PATENT DOCUMENTS

| | | | |
|---|---|---|---|
| 7,801,912 B2 | 9/2010 | Ransil et al. | |
| 8,166,063 B2 | 4/2012 | Andersen et al. | |
| 8,219,752 B1 | 7/2012 | Jenkins et al. | |
| 8,751,460 B1* | 6/2014 | Annapragada | G06F 17/30545 707/684 |
| 9,621,427 B1* | 4/2017 | Shah | G06F 9/45533 |
| 9,740,759 B1* | 8/2017 | Zhang | G06F 17/30575 |
| 2002/0134567 A1* | 9/2002 | Rasmussen et al. | 174/50 |
| 2004/0003087 A1 | 1/2004 | Chambliss et al. | |
| 2004/0243692 A1 | 12/2004 | Arnold et al. | |
| 2005/0038834 A1* | 2/2005 | Souder | G06F 9/5027 |
| 2005/0262377 A1* | 11/2005 | Sim-Tang | 714/1 |
| 2006/0112061 A1* | 5/2006 | Masurkar | 706/47 |
| 2006/0136354 A1* | 6/2006 | Bell et al. | 707/1 |
| 2006/0224736 A1 | 10/2006 | Graziado et al. | |
| 2008/0091300 A1 | 4/2008 | Fletcher et al. | |
| 2009/0019535 A1* | 1/2009 | Mishra | G06Q 10/00 726/12 |
| 2009/0070337 A1* | 3/2009 | Romem et al. | 707/10 |
| 2009/0172782 A1 | 7/2009 | Taglienti et al. | |
| 2009/0276771 A1* | 11/2009 | Nickolov et al. | 717/177 |
| 2010/0017545 A1 | 1/2010 | Gildfind et al. | |
| 2010/0111105 A1 | 5/2010 | Hamilton et al. | |
| 2011/0225165 A1 | 9/2011 | Burstein | |
| 2011/0258179 A1 | 10/2011 | Weissman et al. | |
| 2011/0277027 A1 | 11/2011 | Hayton et al. | |
| 2011/0307886 A1* | 12/2011 | Thanga | G06F 9/5077 718/1 |
| 2012/0124194 A1* | 5/2012 | Shouraboura | H04L 45/122 709/224 |
| 2012/0173581 A1 | 7/2012 | Hartig et al. | |
| 2012/0254258 A1 | 10/2012 | Gao et al. | |
| 2012/0310965 A1 | 12/2012 | Gao et al. | |
| 2013/0013767 A1 | 1/2013 | Stober et al. | |
| 2013/0018989 A1 | 1/2013 | Peek | |
| 2013/0086623 A1 | 4/2013 | Walsh | |
| 2013/0110961 A1 | 5/2013 | Jadhav | |
| 2013/0322427 A1* | 12/2013 | Stiekes | H04L 49/356 370/352 |
| 2014/0006580 A1* | 1/2014 | Raghu | 709/223 |
| 2014/0282581 A1* | 9/2014 | Vonteddu | 718/104 |

OTHER PUBLICATIONS

Moreno-Vozmediano, R. et al. "Elastic Management of Cluster-based Services in the Cloud". ACM. ACDC'09, Jun. 19, 2009. pp. 19-24.*
International Search Report and Written Opinion from PCT/US14/43426, dated Oct. 28, 2014, Amazon Technologies, Inc., pp. 1-13.
U.S. Appl. No. 13/780,077, filed Feb. 28, 2013, Swaminathan Sivasubramanian et al.
U.S. Appl. No. 13/174,189, filed Jun. 30, 2011, Swaminathan Sivasubramanian et al.

* cited by examiner

RESOURCE SILOS AT NETWORK-ACCESSIBLE SERVICES

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of physical and logical resources may be allocated to subscribers and/or their applications, such as whole physical or virtual machines, CPUs, memory, network bandwidth, I/O capacity, or bundled resources such as database servers, scientific computation clusters, and the like.

In many cases of bundled services, the core functions of the service are performed at secure servers or hosts, which may be termed back-end service nodes, that typically cannot be accessed directly from client devices. For example, in the case of network-accessible database services, a number of storage nodes may be established to store client database contents and to perform various types of reads, writes and other data extraction or manipulation operations on behalf of the clients. The clients may typically submit their work requests (e.g., read requests or write requests) to shared front-end intermediary nodes, which may be responsible for performing various types of validation operations on the request, and (for validated requests) transmitting internal representations of the work requests to the appropriate service nodes. At least in some environments, a given back-end service node may also be shared among several clients.

A number of factors may influence the implementation of such network-accessible services. For example, clients' throughput and response time requirements may have to be taken into account when deciding the set of resources to be allocated for the back-end and/or front-end service nodes for a given client. Although sharing the resources of a given node among multiple clients may be conducive to high overall levels of resource utilization, such sharing may at least in some cases have side effects that clients may prefer to avoid. Another important consideration, especially for provider networks that implement modern software development processes that involve frequent service software upgrades, is the potential impact of software upgrades on service stability.

Figure 1:
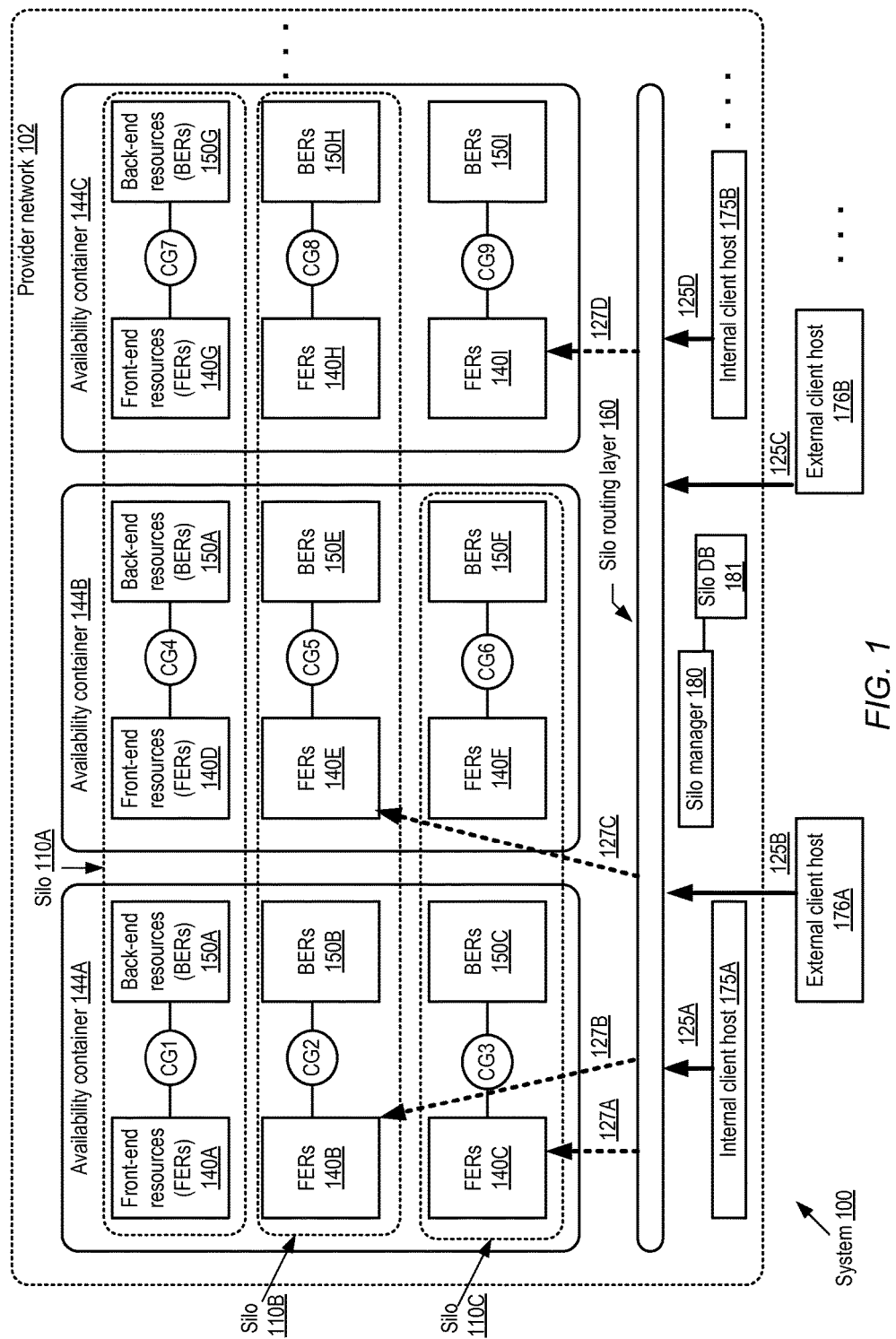
FIG. 1 illustrates an example of a system in which resources may be grouped into configurable silos, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing configurable resource silos at network-accessible services are described. Networks set up by an entity such as a company or a public sector organization to provide one or more multi-tenant and/or single-tenant services (such as various types of cloud-based storage, computing or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

In some embodiments, some or all of the provider network's services may be implemented using a collection of back-end resources (BERs) such as various types of compute or storage servers, to which client work requests are typically redirected by front-end resources (FERs) of the service. FERs may be termed "request routers" or "endpoints" herein. Thus, in such embodiments, clients may typically not be expected or allowed to access BERs directly. At least for storage-related services and database services, various types of client-owned service-managed objects, such as database tables, storage volumes, file systems and the like, may be stored at back-end resources. BERs may also be referred to as "storage nodes" for such types of services. In some implementations of storage-related services, each BER may include one or more storage devices, at each of which portions or all of the client objects of one or more clients may be located. BERs that store data objects on behalf of multiple clients may be referred to herein as "shared" or "multi-client" back-end resources, and storage devices that store contents of data objects belonging to a plurality of respective clients may be referred to herein as "shared" or "multi-client" devices. When a client desires to read from, or write to, a data object, a corresponding read request or write request may be directed to a selected FER, and the FER may redirect the request (or an internal representation of the request) to the appropriate BER or BERs. The term "work request" may be used herein to refer collectively to a client request that may indicate one or more logical and/or physical data accesses (reads), data modifications (writes), or computation operations to be performed on behalf of the client. In at least some implementations, the network-accessible service may set up some set of FERs to be shared by multiple clients, while other FERs may be set up for exclusive or dedicated used by a single client. Similarly, some BERs may be shared among multiple clients, while other BERs may be dedicated to a single client.

For a number of reasons described below, such as fault containment, greater levels of client control of resource allocation, and/or enhanced security, in at least some embodiments, the network-accessible service may group or combine sets of resources into named logical and/or administrative units called resource silos. A given resource silo may include, for example, a set of FERs, a set of BERs, and in some cases a set of network links between FERs and BERs. The network links and the logical and/or physical network connections between FERs and BERs may be referred to collectively as a "connection graph" or "connection group" herein. The grouping criteria for silo membership may vary from one silo to another in at least some embodiments.

In some embodiments, for example to meet data durability requirements, a given service may store multiple replicas of a given storage object such as a database table partition at several different physical locations. In at least some such embodiments, the boundary of a resource silo may be defined such that the resource silo comprises all the replicas of a set of storage objects. Thus, the grouping criteria in such a scenario may be that all the resources that are needed to store and access any given replica of the data of the storage object should be included in the silo. For a partition P1 of table T1, in one example implementation, one replica P1-R1 may be maintained at BER1 of data center DC1, another replica P1-R2 may be maintained at BER2 of data center DC2, and a third replica P1-R3 may be maintained at BER3 of data center DC3. Corresponding to each replica, there may be one or more FERs designated to receive client-generated work requests (such as read or write requests), validate the requests, and transmit internal representations of the requests to the appropriate BER at which the replica is stored. Various different approaches may be taken as to how to distribute work request among the different replicas in different embodiments: for example, reads may be directed to any of the replicas, while writes may be directed first to a particular replica designated as the "write master" replica, and updates may be propagated from the write master to the remaining replicas. In one embodiment in which table partitions managed by a database service are replicated in the manner described above, a resource silo may for example, be configured for a group of tables [T1, T2, . . . , Tn] such that the silo includes (a) all the BERs containing replicas of any partition of any table of the group, including BERs that may be located at different geographical locations or data centers (b) enough FERs to provide a desired level of connectivity to the BERs for some anticipated level of workload directed at the group of tables, and (c) the network links and devices to support the desired level of connectivity. Thus, a resource silo may include not only resources at both the back-end and front-end layers of the service, but also resources at multiple data centers in such embodiments. Numerous resource silos, each one containing replicas of the partitions of respective groups of one or more tables, may be set up in some embodiments. A resource silo may be targeted for at least some types of administrative operations as an isolated unit, logically independent of other resources of the service and of the provider network. For example, when an upgraded software module (e.g., a component of the service) is to be deployed, the deployment may be rolled out one silo at a time, so that, for example, the operational impact of any errors (either due to bugs in the newly-deployed module, or due to user errors that may be the result of unfamiliarity with the upgraded software) encountered within a silo is contained within the confines of the silo.

In some embodiments, resource silos may also be configured with respective independent infrastructure components. For example, each data center of a geographically-distributed provider network in one embodiment may comprise a plurality of data center rooms. Each data center room may comprise a plurality of rack groups, where each rack group includes a collection of racks containing resources such as servers (which may be usable as BERs and/or FERs), as well as an independently controllable set of infrastructure components used for the servers of the rack group. Such independently controllable infrastructure components may, for example, include electrical power components, cooling components, and networking components. Each rack group may be engineered in such a way that an infrastructure failure, such as a power outage, a cooling system failure, or a network outage encountered at the rack group can be contained within the rack group (i.e., the failure does not result in cascading or correlated failures, at least with a very high probability, at other rack groups). In some such embodiments, resource silo boundaries may be defined using rack group boundaries—e.g., a given resource silo may comprise an integral number of rack groups. In such scenario, the grouping criteria for silo membership may include physical location of computing resources and infrastructure components.

According to at least one embodiment, resource silos of a service may be defined either by the service as part of its service management functions (e.g., to support internal goals such as fault containment and rapid recovery after infrastructure failures), or as a result of a specific client request. A particular client may wish to include several resources that are allocated to or owned by that client, potentially spread across an arbitrary combination of data centers and service layers, into a single resource silo. One or more client-facing programmatic interfaces, such as application programming interfaces (APIs), web pages, command-line tools, or graphical user interfaces, may be implemented by the service in some embodiments to enable clients to request the creation of resource silos, and to perform various types of silo management operations, such as adding or removing resources, migrating data from one silo to another, and so on. Such silos may be referred to as "client-requested dedicated silos", as each such silo comprises resources that are exclusively designated for use by a single client entity (e.g., from computing devices being used by the users and applications of a single client organization). The grouping criteria for such silos may thus include common ownership of resources, as well as any other criteria determined by the client.

Generally speaking, resource silos may be established for various reasons in different embodiments; some at the initiative of a client, and others at the initiative of the service without any explicit requests from the client. In each case, some set of grouping criteria or requirements may be used to determine the silo boundaries. That is, some subset of the resources of the service may be categorized as members of a resource silo, based on the grouping requirements or criteria. In some cases, a given resource silo may comprise at least some BERs and at least some FERs, and the member resources of the silo may be distributed among multiple data centers of the provider network. In order to route client work requests to the appropriate front-end resources within the appropriate silo, in at least some embodiments a silo routing layer comprising one or more silo routing nodes may be established. Such a silo routing layer may be responsible for identifying the particular silo to which a given client-generated work request is to be directed; i.e., which particular silo is the target for any given work request. Thus, silos may represent an additional layer of abstraction with respect to network address determination for directing client work requests in some embodiments, and the silo routing layer may be established to translate a data object's identifier or name, specified in a work request, into the network addresses of an FER of the silo at which the data object is stored. In some implementations, clients may be provided silo identifiers for the silos in which resources of interest are located, and client work requests may include the silo identifiers in addition to, or instead of, the data objects; at least in some such scenarios, the silo routing layer may be responsible for identifying the network address of the specific FER within a specified silo to which a given client work request should be directed. In other implementations, clients may not necessarily be informed about at least some silo identifiers or silo names.

In some cases, the client's work request may be directed to a selected FER of the silo by a silo routing node, and in other embodiments, the silo routing layer may inform the client regarding the network address of the FER of the target silo, and let the client direct the work request to that address. When the work request reaches the selected FER, the request may be validated (e.g., one or more authentication and/or authorization operations may be performed), and a representation of the work request may be transmitted from the FER to a selected BER via a network connection used for intra-silo traffic within the target silo. At the selected BER, one or more work operations corresponding to the client's request may be performed. In at least some embodiments, persistent network connections (e.g., Transmission Control Protocol or TCP connections) may be maintained between a given FER and one or more BERs of a given resource silo, so that, for example, overhead associated with opening and initializing new network connections is reduced.

Example System Environments

FIG. 1 illustrates an example of a system in which resources may be grouped into configurable silos, according to at least some embodiments. As shown, system 100 comprises a provider network 102 in which a plurality of multi-tenant and/or single-tenant network-accessible services are implemented using a variety of hardware and software resources. For a particular network-accessible service, back-end resources (BERs) 150 (e.g., 150A-150I) and front-end resources (FERs) 140 (e.g., 140A-140I), linked by respective connection graphs (labeled CG1-CG9), are shown distributed among a plurality of availability containers 144A, 144B and 144C. A given availability container 144 may comprise a portion or all of one or more data centers in the depicted embodiment, and may be engineered in such a way as to prevent various types of failures within a given availability container from impacting operations at other availability containers. Thus, for example, availability container 144A may comprise a set of hardware, software and infrastructure components (such as power supplies, power distribution units, cooling/heating equipment, networking equipment and the like) that has a failure profile (e.g., a probability distribution of various types of faults or errors) that is not expected to be correlated with the failure profile of a different availability container 144B or 144C. Each availability container may itself be designed to have very low failure rates, along with the isolation characteristics that prevent cascading faults across multiple availability containers. The implementation of numerous availability containers 144 capable of containing failures within their boundaries may thus help support highly reliable and durable services—e.g., in one implementation, N replicas of the same database table partition may be stored at each of N different availability containers so that the partition remains accessible even if N−1 availability containers happen to become unavailable at once, reducing the probability of a complete outage to very near zero. Availability containers may also be referred to as "availability zones" in some implementations. In at least some embodiments, the resources of a geographically distributed provider network may be organized into a hierarchy of geographical regions, with each region comprising some number of availability containers, and each availability container comprising part or all of one or more data centers.

In the embodiment shown in FIG. 1, the resources of the service have been categorized into three resource silos 110—silo 110A, silo 110B and silo 110C. Each silo 110 comprises a combination of front-end and back-end resources, and also a combination of resources from different availability containers (which may correspond in many cases to different data centers). Thus, for example, silo 110A comprises FERs 140A and BERs 150A with connection graph CG1 in availability container 144A, FERs 140D, BERs 150D and connection graph CG4 in availability container 144B, and FERs 140G, BERs 150G and connection graph CG7 in availability container 144C. Similarly, silo 110B comprises FERs 140B and BERs 150B with connection graph CG2 in availability container 144A, FERs 140E, BERs 150E and connection graph CG5 in availability container 144B, and FERs 140H, BERs 150H and connection graph CG8 in availability container 144C. Silo 110C includes FERs 140C and BERs 150C with connection graph CG3 in availability container 144A, FERs 140F, BERs 150F and connection graph CG6 in availability container 144B, and FERs 140I, BERs 150I and connection graph CG9 in availability container 144D. In general, resource silos 110 may be established for any of a variety of reasons in different embodiments, such as to offer a different dimension of fault containment than is possible with availability containers alone, or to offer the ability to perform various types of administrative operations on a plurality of resources treated as a unit rather than on each resource individually. In some embodiments in which a database service implements resource silos, all the resources used to store and access a given set of tables—e.g., all the back-end replicas (in environments in which multiple replicas are stored) of all the partitions of the tables of the set, the associated indexes, table metadata, and the like, together with front-end resources, may be included within the boundary of a single resource silo. For data durability reasons, different table partition replicas may often be stored in different data centers or different availability containers, resulting in a silo organization similar to that shown in FIG. 1, where each silo encompasses a portion of multiple availability containers.

A silo manager 180 may be responsible for administration of resource silos 110 in some embodiments. Although shown as a single discrete entity in FIG. 1, silo manager 180 may itself comprise a plurality of hardware and/or software components and modules that may be distributed across various devices or servers at different data centers or different availability containers 144. Silo membership information (e.g., to which silos, if any, a particular resource of the provider network belongs) may be stored in a silo database 181 in at least some embodiments. A silo routing layer 160 may comprise one or more silo routing nodes that are configured to identify, for a given work request from a client, to which silo the work request should be directed (e.g., based on information stored in silo DB 181, or on information cached at the silo routing node). In the depicted embodiment, the silo manager 180 may implement one or more programmatic interfaces (e.g., APIs, web pages, and the like) enabling clients to submit various types of silo-related requests, such as requests to create, modify or delete silos, to migrate data from one silo to another, and so on.

Figure 2:
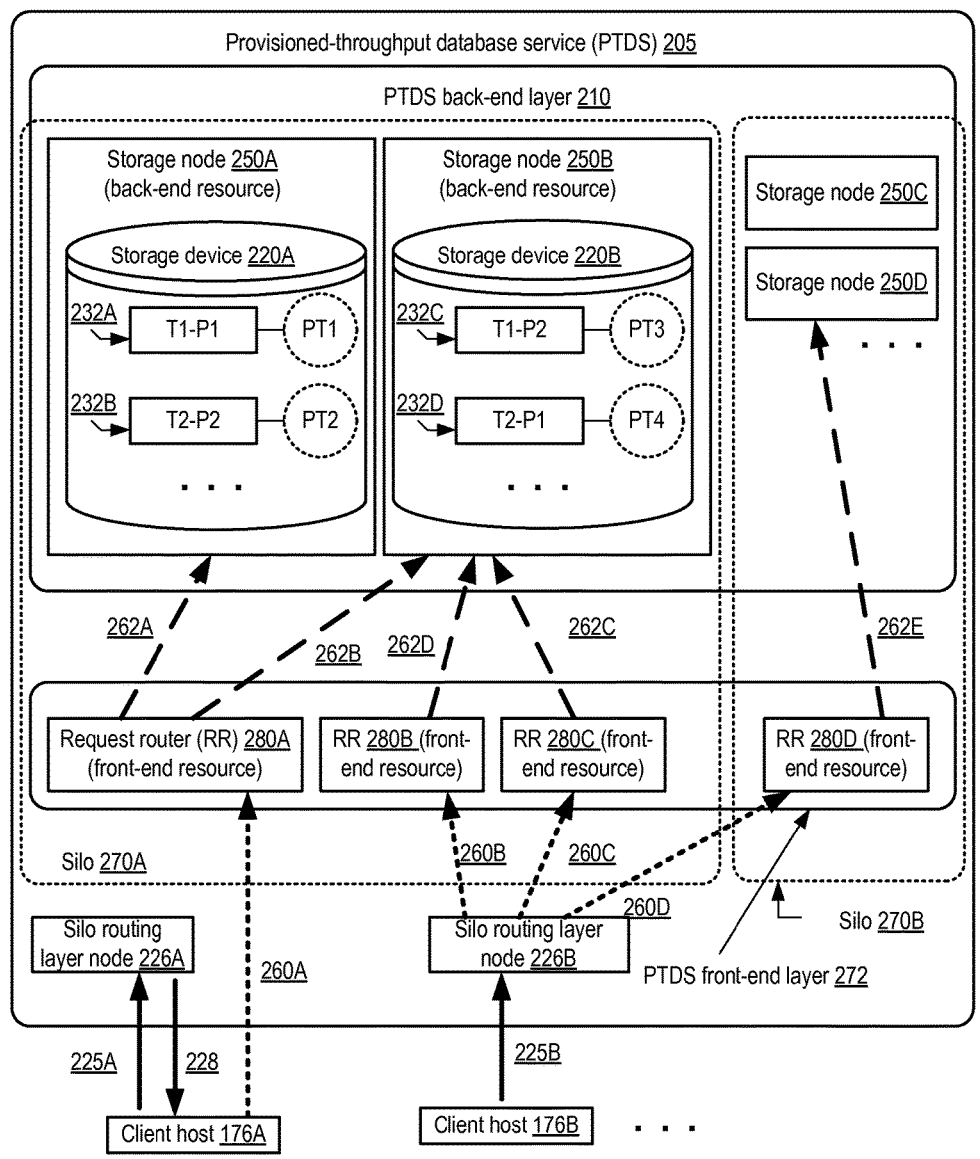
FIG. 2 illustrates an example provisioned-throughput database system in which resource silos may be configured, according to at least some embodiments.

Clients of the service being implemented at the silos 110, which may include application modules executing on behalf of various client entities at internal client hosts 175 (e.g., 175A or 175B) or external client hosts 176 (e.g., 176A or 176B) may submit work requests (such as reads or writes in the case of storage-related services) for which corresponding work operations ultimately have to be performed at one or more BERs 150. Arrows 125A, 125B, 125C and 125D in FIG. 1 represent client-submitted work requests. The client work requests 125 may be routed to the appropriate BERs 150 in two steps in the depicted embodiment. First, at the silo routing layer 160, the target resource silo for a given work request may be identified and the work request may be routed to a selected FER 140 of that target silo, as indicated by the arrows labeled 127A, 127B, 127C and 127D. (This type of routing of client work requests may be referred to as "in-band" routing. An example of a different approach to client work request routing, called "out-of-band" routing, in which the silo routing layer 160 is responsible for providing addresses and/or routing information to clients instead of redirecting client requests, is illustrated in FIG. 2). Next, within the target silo, an internal representation of the work request may be routed from the selected FER 140 to one or more selected BERs 150 via one or more connections of the connection graph CGx corresponding to the FER. The work operations may then be performed at the selected BER(s). In some embodiments, and depending on the nature of the work request, a response may be provided to the client. The determination of exactly which BER(s) are to implement the requested work may be done at the selected FER in some embodiments, or at the silo routing layer node at which the FER was selected in other embodiments. Each connection graph CG1-CG9 may include one or more persistent connections in at least some embodiments, so that connection establishment/initiation delays can be eliminated from the work request/response path to the extent possible. As shown in FIG. 1, some client hosts (such as 175A and 175B) may be within the provider network (e.g., client hosts 175 may comprise virtual compute servers implemented at one of the services of the provider network), while other client hosts 176 may be located at client networks outside the provider network.

It is noted that in some embodiments, when a client establishes a silo or creates a data object that is to be managed by the service, the network address(es) of the FERs of the silo may be provided to the client by the silo manager, and the silo routing layer 160 may not be required. The clients may also be allowed to query the silo manager for metadata regarding resource silos (such as FER network addresses) in some embodiments. In some embodiments out-of-band silo routing may be implemented as a network-accessible service, such that clients may query a service implemented using the silo routing layer to determine the network addresses of the FERs. In one embodiment, all the resources of the service may be grouped into silos, while in other embodiments, some resources may remain unassociated with any particular silo. Some resource silos may be service-defined, e.g., the service may assign resources to silos without corresponding client requests for silo creation; other silos may be established at client request. A given resource (e.g., an FER, a BER, or a portion of a connection graph) may be a member of more than one silo in some embodiments.

FIG. 2 illustrates an example provisioned-throughput database system (PTDS) 205 in which resource silos may be configured, according to at least some embodiments. In a PTDS, each database table or table partition may be assigned a corresponding provisioned throughput, indicating a maximum rate of work requests (such as reads/second and/or writes/second) which the provider of the service is obligated to support (at least under most operating conditions). The provisioned throughput for a table as a whole may, for example, be specified initially by a client when the table is created, and the PTDS (or the client) may distribute the table's provisioned throughput into the respective provisioned throughput values for each of the table's partitions. Clients may be required to pay amounts proportional to the provisioned throughputs for their objects according to some pricing models. In at least some embodiments, the provisioned throughput of a given table or partition may be modified over time, e.g., at client request or by the PTDS. For a given table partition, provisioned throughput may be assigned at the back-end resource used to store the data of the partition, and in some embodiments, provisioned throughput may be assigned at the front-end resources as well.

In the embodiment depicted in FIG. 2, the database service 205 comprises a back-end layer 210 and a front-end layer 272. The back-end layer 210 comprises a plurality of storage nodes 250 (the BERs of the service), such as 250A, 250B, 250C and 250D. A given storage node 250 may comprise one or more storage devices 220, such as storage device 220A at storage node 250A and storage device 220B at storage node 250B. (Storage devices of storage nodes 250C and 250D are not shown.) Each storage device 220 (which may be implemented using any appropriate storage technology, such as various types of rotating disk-based devices, solid-state devices and the like) may include one or more table partitions 232, or replicas of table partitions. For example, storage device 220A comprises T1-P1 (partition 1 of table T1, labeled 232A) and T2-P2 (partition 2 of table T2, labeled 232B), while storage device 220B comprises T1-P2 (partition 2 of table T1, labeled 232C) and T2-P1

(partition 1 of table T2, labeled 232D). Each partition 232 has a respective provisioned throughput for work operations such as reads or writes, as indicated by the elements PT1, PT2, PT3 and PT4.

PTDS front-end layer 272 comprises a number of request routers (RRs) 280 (the front-end resources), such as RR 280A, 280B, 280C and 280D. Each request router 280 may be configured to receive work requests generated by clients, validate the work requests, and transmit corresponding internal representations of the work requests to one or more selected storage nodes 250. One or more RRs 280, and one or more storage nodes 250, may be grouped as members of a given resource silo in the depicted embodiment. For example, silo 270A comprises RRs 280, 280B and 280C, and storage nodes 250A and 250B. while silo 270B comprises RR 280D and storage nodes 250C and 250D. Silo boundaries may be defined on the basis of any of various criteria in the depicted embodiment—for example, silo 270A may include all the data and metadata corresponding to tables T1 and T2. The silos 270 may be established by the PTDS itself, without client-submitted silo creation requests in some embodiments, or in response to client requests. A given client may have any number of silos (including zero silos) established on its behalf in the depicted embodiment.

In the depicted embodiment, work requests 225A and 225B (such as requests for database reads or writes) may originate at a client host 176, e.g., from a client application on host 176A or 176B. Silo routing layer nodes 226, such as nodes 226A and 226B, may be responsible for identifying which particular silo is the target of a given work request or a set of work requests (e.g., a mapping between tables and silos may be used by the routing layer nodes). At least two types of silo routing layer functionality may be supported in the depicted embodiment. Some silo routing layer nodes, such as node 226B, may be responsible for receiving client work requests and for directing the work requests to a selected RR 280 at the selected silo 270, as indicated by the arrows 260B, 260C and 260D. Such silo routing layer nodes may be termed "in-band" silo routing nodes in some implementations, as indicated earlier. Other silo routing layer nodes, such as node 226A, may provide routing/address information regarding RRs to clients, which can then be used by the client to submit one or more work requests to the RRs 280. Silo routing layer nodes similar to 226A, which are configured to provide routing or address information to clients instead of redirecting client work requests, may be termed "out-of-band" silo routing nodes. For example, a work request (or a routing query) from client host 176A, directed for silo 270A, may be received at node 226A, as indicated by arrow 225A. In response (as indicated by arrow 228) the client may be provided a network address or other routing information to enable the client to access RR 280A of silo 270A. The client may then directly send its work request (and in some cases one or more subsequent work requests directed to the same resource silo 270A) to RR 280A. In some embodiments, all of the silo routing layer nodes may implement only one kind of routing, e.g., either in-band routing (in which client work requests are redirected to the RRs by the routing layer nodes) or out-of-band routing (in which clients are expected to transmit work requests directly to RRs using routing information supplied by the silo routing layer nodes). In other embodiments, a given silo routing layer node may implement either approach, or different silo routing layer nodes may implement respective approaches to routing. The type of routing that is implemented at a given node or for a given client request may depend on various factors in different embodiments, such as the identity of the client, configuration settings for the targeted silos, or configuration settings of the silo routing layer nodes. In some embodiments, as noted earlier, an out-of-band silo routing layer may be implemented as a network-accessible service, such that clients may query the routing layer service to determine the network addresses of the RRs.

When a given RR 280 receives a work request, it may transmit a corresponding representation of the work request to a selected storage node 250 via a network connection, such as a persistent connection set up for the RR as part of the silo's connection graph (connection graphs are not shown in FIG. 2). The transmission of such representations to the back-end storage nodes from the RRs is indicated by arrows 262, such as 262A, 262B, 262C, 262D, and 262E. It is noted that although data center and availability container boundaries are not shown in FIG. 2, and partition replicas are also not shown, in at least some embodiments more than one data center or availability container may be used for the partitions (or partition replicas) included within a given PTDS silo 270.

Silos for Application Lifecycle Stages

Figure 3:
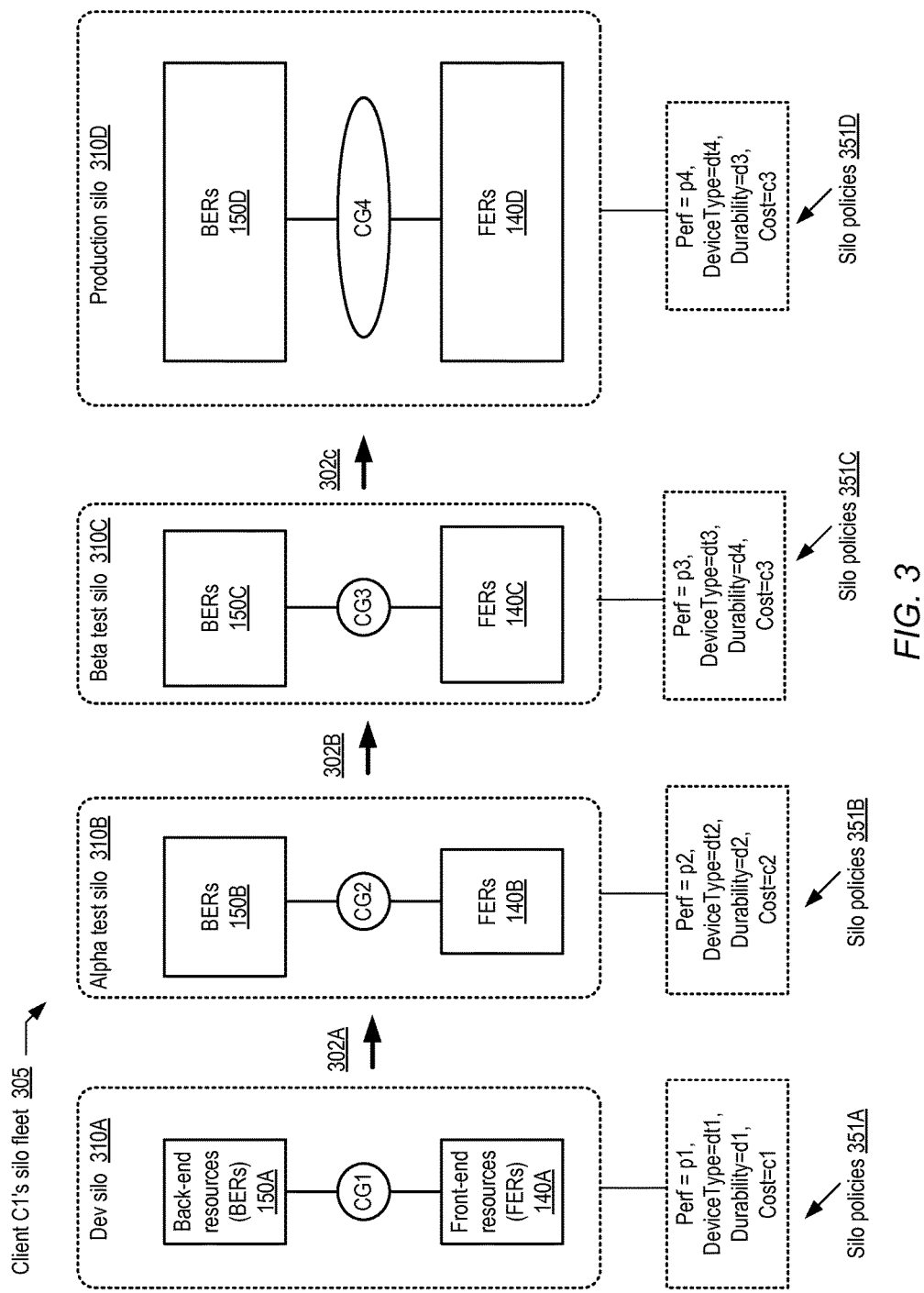
FIG. 3 illustrates an example collection of resource silos that may be established on behalf of a client, according to at least some embodiments.

In some embodiments, respective resource silos with different performance, durability, security and other characteristics may be established for different stages of a software application development/deployment environment. FIG. 3 illustrates an example collection of resource silos that may be established on behalf of a client, according to at least some embodiments. Such a collection may be referred to as a "silo fleet" of the client. As shown, client C1's silo fleet 305 comprises a development silo (dev silo) 310A, an alpha test silo 310B, a beta test silo 310C, and a production silo 310D in the depicted embodiment. Each of the silos 310 may be used for a respective stage of an application development process, and each may include a respective set of FERs and BERs linked by a connection graph. The resources of each silo may be isolated from each other in various ways, e.g., with respect to fault containment or physical location.

One or more of client C1's applications may be developed using the resources of development silo 310A in the depicted embodiment. If the client builds an application on top of a database service of the provider network, for example, BERs 150A may include some set of storage nodes storing the tables used for the applications, while FERs 140A may be used to direct work requests to the tables via connection graph CG1. The resources included in the development silo may be characterized by silo policies 351A, which may also be referred to as a silo profile. The silo policies or profile may indicate a number of silo properties, such as performance characteristics p1 of the resources (e.g., the throughputs and latencies supported for some reference workload), the device types dt1 used for the BERs, FERs and network links between the BERs and FERs, a durability level for the application data, and a cost to the client.

Similarly, silo 310B may be established for an alpha test phase of the application, with a different set of BERs 150B, FERs 140B, and connection graph CG2. Silo 310C may be set up for a beta test phase of the application (with BERs 150C, FERs 140C and connection graph CG3), and silo 310D (with BERs 150D, FERs 140D and connection graph CG4) may be set up for a production environment. At least some of the silo policies 351A, 351B, 351C and 351D may differ from another in one or more of the silo characteristics, such as performance, device types, durability or cost. When a software modification or upgrade is to be applied in the depicted embodiment, either to the service software employed at the BERs/FERs, or to the application code of the client, the modification may be applied one silo at a time, so that any potential deleterious effects are contained within a silo boundary. In at least some embodiments, multiple silos may be employed for a given stage of the development process—e.g., several different silos may be set up for production, with software changes rolled out one silo at a time within production. Each silo may include resources at one or more data centers, and/or in one or more availability containers in the depicted embodiment.

Service-Defined Versus Client-Requested Silos

Figure 4:
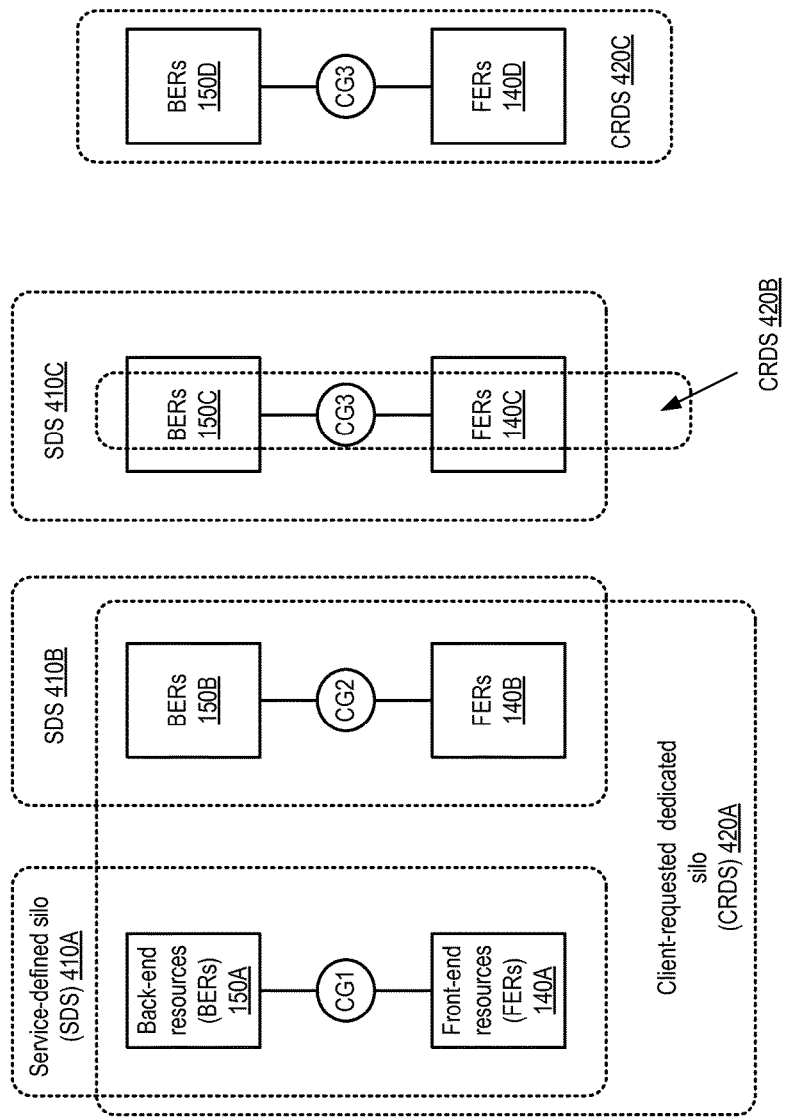
FIG. 4 illustrates examples of service-defined resource silos and client-requested dedicated resource silos, according to at least some embodiments.

As indicated above, in at least some embodiments, a given resource silo may be established either by the network-accessible service involved, or at the explicit request of a client of the service. FIG. 4 illustrates examples of service-defined silos (SDSs) and client-requested dedicated silos (CRDSs), according to at least some embodiments. Service-defined silos 410, such as SDS 410A, 410B or 410C, may be set up for any of various administrative purposes in different embodiments, such as to lower the risks associated with service software upgrades or modifications, or to aggregate resources with similar performance, durability or other characteristics. In some embodiments, by default, the resources used for a particular service or group of services of the provider network 102 may be grouped into silos, and the default unit of resource allocation to any given client may be a silo. In other embodiments, by default, service resources may not be assigned to any given silo, although the service may set up SDSs as and when needed for specific purposes such as software rollouts.

A given client may organize the resources allocated or dedicated to the client into silos based on any combination of factors, such as the applications being implemented at the resources, the stage of application development (as illustrated in FIG. 3), the characteristics and requirements of the data being stored on behalf of the client by the service, to reflect an hierarchy of the client's business or organization, or on the basis of other factors. The term "dedicated" in the name "client-requested dedicated silo" indicates that the resources of the CRDS are in most cases for the exclusive use of one client entity (i.e., for use by or for applications executed on behalf of a single client entity, such as a business organization, or a group of one or more users, of the provider network). As indicated in FIG. 4, a client-requested dedicated silo 420, such as CRDS 420A, may include portions or all of several different service-defined silos in at least some embodiments. Thus, CRDS 420A includes BERs 150A and 150B, as well as FERs 140 and 140B, of SDSs 410A and 410B. In some cases, as in the case of CRDS 420B, a client-requested dedicated silo may include only a subset of an SDS 410 (e.g., not all the BERs 150C of SDS 410C are included in CRDS 420B, and similarly, not all the FERs 140C are included in CRDS 420B). Some CRDSs, such as CRDS 420C, may include resources that do not belong to any SDS. Generally speaking, any given resource of the provider network 102 may be a member of zero or more SDSs and zero or more CRDSs in the depicted embodiment. Although the silos shown in FIG. 4 each comprise BERs and FERs, in at least some implementations, a given resource silo may comprise only BERs or only FERs. In at least some implementations, the physical and/or virtual resources that are used to implement BERs may be similar (or even identical) to the resources that are used to implement FERs—for example, virtualized servers may be used for both front-end and back-end layers of a given network-accessible service.

Silos with Independently-Managed Infrastructure

Figure 5:
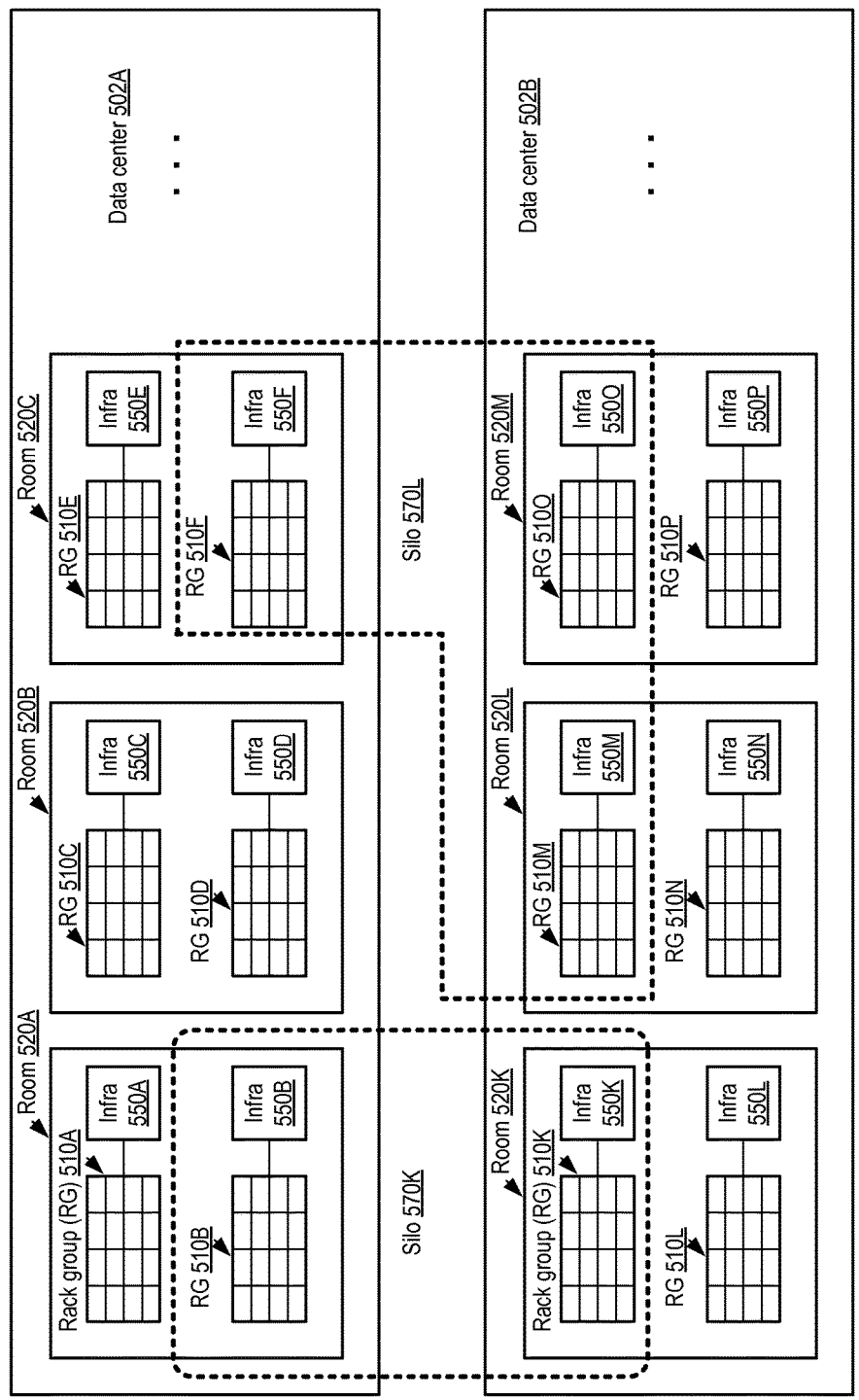
FIG. 5 illustrates an example resource grouping hierarchy at a plurality of data centers at which configurable resource silos are supported, according to at least some embodiments.

In some embodiments, data centers may be organized hierarchically into units of independently manageable resources and infrastructure components, and such units may be used as building blocks to establish silos that span multiple data centers. FIG. 5 illustrates an example resource grouping hierarchy at a plurality of data centers at which configurable resource silos are supported, according to at least some embodiments. Two example data centers, 502A and 502B, are shown in FIG. 5. Each of the data centers 502 comprises a plurality of data center rooms, such as rooms 520A, 520B and 520C in data center 502A and rooms 520K, 520L, and 520M in data center 502B. Each room in turn comprises one or more rack groups 510 with associated infrastructure elements 550. Each rack group 510 may comprise one or more server racks, at each of which a plurality of servers or other computing devices are located. The associated infrastructure components, designated as "infra" 550, may include a set of power distribution components, heating/cooling components, networking-related components (such as networking cables and devices used for the connection graphs between FERs and BERs) and the like that may be required for the servers of the rack group 510. The infrastructure components 550 for a given rack group may be independently controllable with respect to the infrastructure components for any other rack group—e.g., it may be possible to adjust the power, cooling, or networking configuration for a given rack group 510 independently of the configuration of other rack groups. A rack group 510 may be considered a fault containment unit with respect to various types of infrastructure faults or other faults in the depicted embodiment—e.g., if a power distribution unit (PDU) of rack group 510A fails at data center 502A, the servers and infrastructure of rack group 510B, 510C etc., either within the same room or in a different room (or in a different data center), may not be affected. Similarly, if a set of network cables or a cooling unit for rack group 510M failed, operations at rack group 510K, 510L etc. may not be affected.

It is noted that although in FIG. 5, each room 520 is shown as comprising a plurality of rack groups 510, different mappings between rooms and rack groups may be supported in various embodiments. For example, in some cases, because of the infrastructure organization, all the server racks in a given room 520 may belong to the same rack group, such that there is a 1:1 relationship between rooms and rack groups. In other scenarios, the minimum set of independently-controllable infrastructure components may correspond to more than one room, so racks at multiple rooms may be included within one rack group. Some data centers may include only one room comprising one or more rack groups with the corresponding infrastructure components.

Resource silos that span multiple data centers may be assembled using rack groups 510 as building blocks in various embodiments. For example, as shown, rack group 510B of room 520A at data center 502A may be combined with rack group 510K of room 520K of data center 502B (together with their respective infrastructure components 550B and 550K) to form silo 570A in FIG. 5. Similarly, silo 570B may comprise rack groups 510F (room 520C, data center 502A), 510M (room 520L, data center 502B), and 510O (room 520M, data center 502B), together with infrastructure components 550F, 550M, and 550O. In at least some embodiments, at least the service-defined resource silos may each comprise some integral number of rack groups 510. In other embodiments, client-requested resource silos may also or instead be structured as an integral number of rack groups.

It is noted that not all the rack groups 510 within a given room 520 or a given data center 502 may include the same number of racks or servers in some embodiments. Furthermore, a heterogeneous mix of server types and other devices and components may be used for a given rack group in some implementations—that is, not all the computing devices in a given rack group may be identical, and neither the computing devices nor the infrastructure components need be identical across all the rack groups at a given data center. In some embodiments, the types and/or numbers of components and devices included within a rack group for a given network-accessible service may differ from the types and/or numbers of components and devices used for a rack group for another network-accessible service, i.e., rack groups (and silos) may be architected in a service-specific way. Thus, for one service S1, a rack group may comprise 144 servers with the associated infrastructure in such embodiments, while for a different service S2, 1024 servers may be bundled into one rack group.

Silo Configuration Properties

Figure 6:
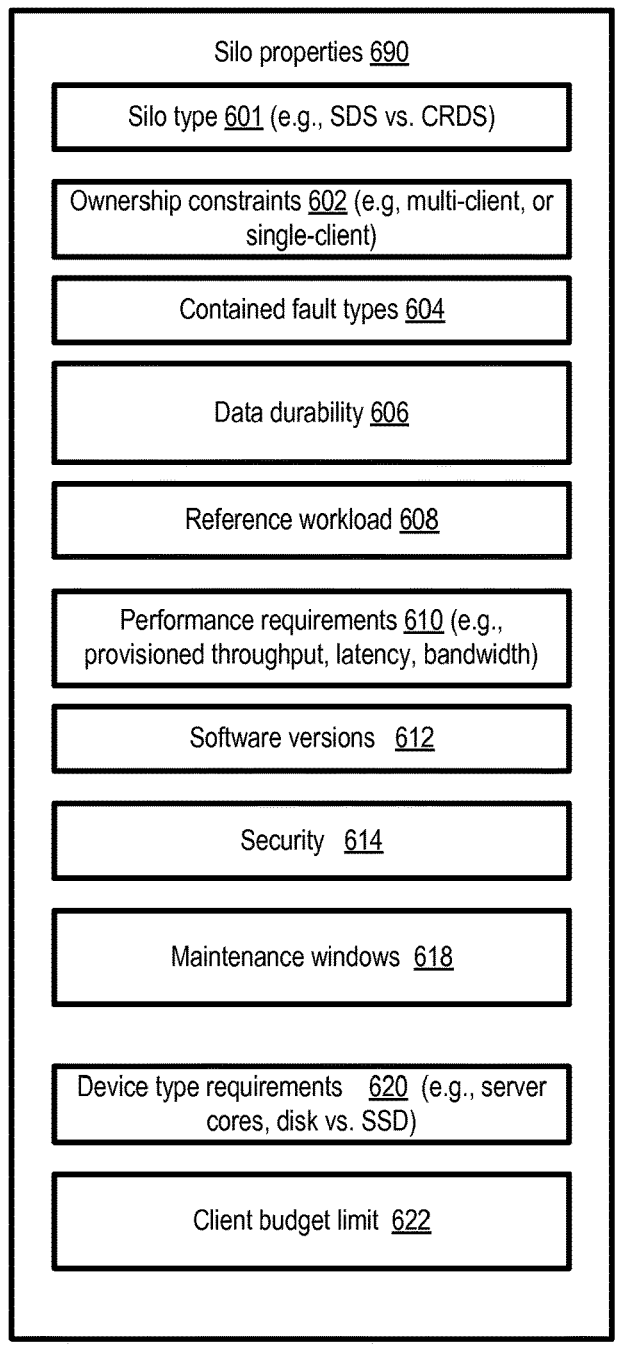
FIG. 6 illustrates example configuration properties of a resource silo, according to at least some embodiments.

FIG. 6 illustrates example configuration properties 690 of a resource silo, according to at least some embodiments. At least some such settings may be stored within silo database 181 by silo manager 180 in various embodiments. As shown, the properties may indicate a silo type 601, such as whether the silo was service-defined or client-requested. Ownership constraints 602 may indicate, for example, whether resources allocated to or owned by different clients may be included within the silo, or whether only a single client's resources are to be included within the silo. Silos that comprise only a single client's resources may be termed "dedicated clusters" in at least some implementations. In some network-accessible services, some types of resources (such as storage devices at storage nodes similar to those shown in FIG. 2) may by default be shared among multiple clients, which may occasionally result in resource contention between the workloads of different clients. Restricting a resource silo to contain only resources for a single client may eliminate, or at least substantially reduce, the probability of impacting the performance of one client's workload by the workload of a different client, and some clients may therefore be willing to bear additional costs (if any) associated with dedicated silos or clusters. In addition to reducing potential negative impacts on performance, clients may also reduce security-related risk by using dedicated silos in at least some embodiments. As applications of only a single client may be allowed to run at resources of a dedicated silos, whereas applications from several clients may run at shared resources of non-dedicated silos, more opportunities for security breaches or attacks may generally be expected at non-dedicated silos.

In at least some embodiments, resource silos may be setup at least in part to contain or limit the impact of errors or faults, that is, resources may be selected or categorized as silo members based on the ability to prevent faults from impacting operations outside the silo. The types of faults or errors that are to be contained may be stored with the properties of the silo, e.g., as a contained fault types element 604. In one embodiment, for example, the contained fault types may include any combination of (a) errors arising from a deployment of a software module (e.g., an upgraded module) that contains a software fault or bug, (b) hardware errors at various computing devices, (c) infrastructure outages (e.g., power outages, cooling system failures, and/or network outages), and (d) human error or user error.

Silos may differ from each other in the data durability level supported in some embodiments: e.g., database table partitions stored in one silo S1 may have a target durability level of 99.99999%, while database table partitions stored in another silo S2 may have a different target durability level of 99.99%. Accordingly, in such embodiments, the data durability 606 associated with a silo may be included in the properties 690 of the silo.

According to one embodiment, respective silos may be defined for different types or levels of workloads of a respective network-accessible service. For example, in a provisioned-throughput database service similar to PTDS 210 of FIG. 2, one resource silo S1 may be set up to contain enough resources to support up to 1000 reads/writes per second, while a different resource silo S2 may be set up to support up to 5000 reads/writes per second. In some such embodiments, an indication of performance requirements 610 (such as provisioned throughput, latencies, or network bandwidth connectivity) for the silo may be included in the silo properties 690. In at least some implementations, the performance requirements may apply to a reference workload 608 (e.g., a mix of 50% random reads of 4 KB each, and 50% random writes of 4 KB each), which may also be indicated in the properties.

In some cases, silos may differ from each other in the software versions deployed at various resources. For example, one silo S1 may contain a beta-test version of software code (either service-provided code, client application code, or both) at either the BERs, the FERs, or the FERs and the BERs, while another silo S2 may be restricted to production code. In some embodiments, an indication of the software versions 612 that are allowed at the resources of the silos may be included in silo properties 690. In some embodiments, different silos may have different security settings 614—e.g., some silos may be configured to store highly secure data, while others may store data to which access is less restricted.

Silos may be established with different maintenance windows in some embodiments. For example, a client may wish to ensure that a particular set of applications is not to be interrupted by a maintenance window of service software except during specified time periods such as between 1 AM and 3 AM ion Wednesdays. In such cases, the client may establish a silo for those applications, and information regarding the restrictions on maintenance windows may be stored as a silo property 618.

In some embodiments, a network-accessible service may be implementable using a variety of different device types in a provider network—e.g., for a storage-related service, data may be stored on solid-state drives, storage arrays, individual disks, and the like. Similarly, for processing elements, various combinations of different numbers of cores or CPUs with different clock speeds, cache memory sizes, and the like may be available. Each type of device may have a different performance profile, availability profile, cost, and so on. In some such embodiments, respective silos (or silo types) may be set up to use a specific device type, or a specific combination of device types, and the properties stored for the silo may include an indication of the device type requirements 620. In at least some embodiments, a given resource silo may have an associated client budget limit 622—e.g., the service may be obligated to ensure that the client's bill for the use of the resources of the silo should not exceed a specified amount during a specific billing period. The budget constraint may impact the choice of the resources included in the silo, and/or the provisioned throughput assigned to the silo's resources, for example, and the service may adjust its admission control policies for accepting/rejecting work requests at the silo in order to comply with the budget limit. It is noted that in different embodiments, only a subset of the properties illustrated in FIG. 6 may be stored for a given silo, and that in some case a record of additional properties may be stored.

Methods for Silo Management

Figure 7:
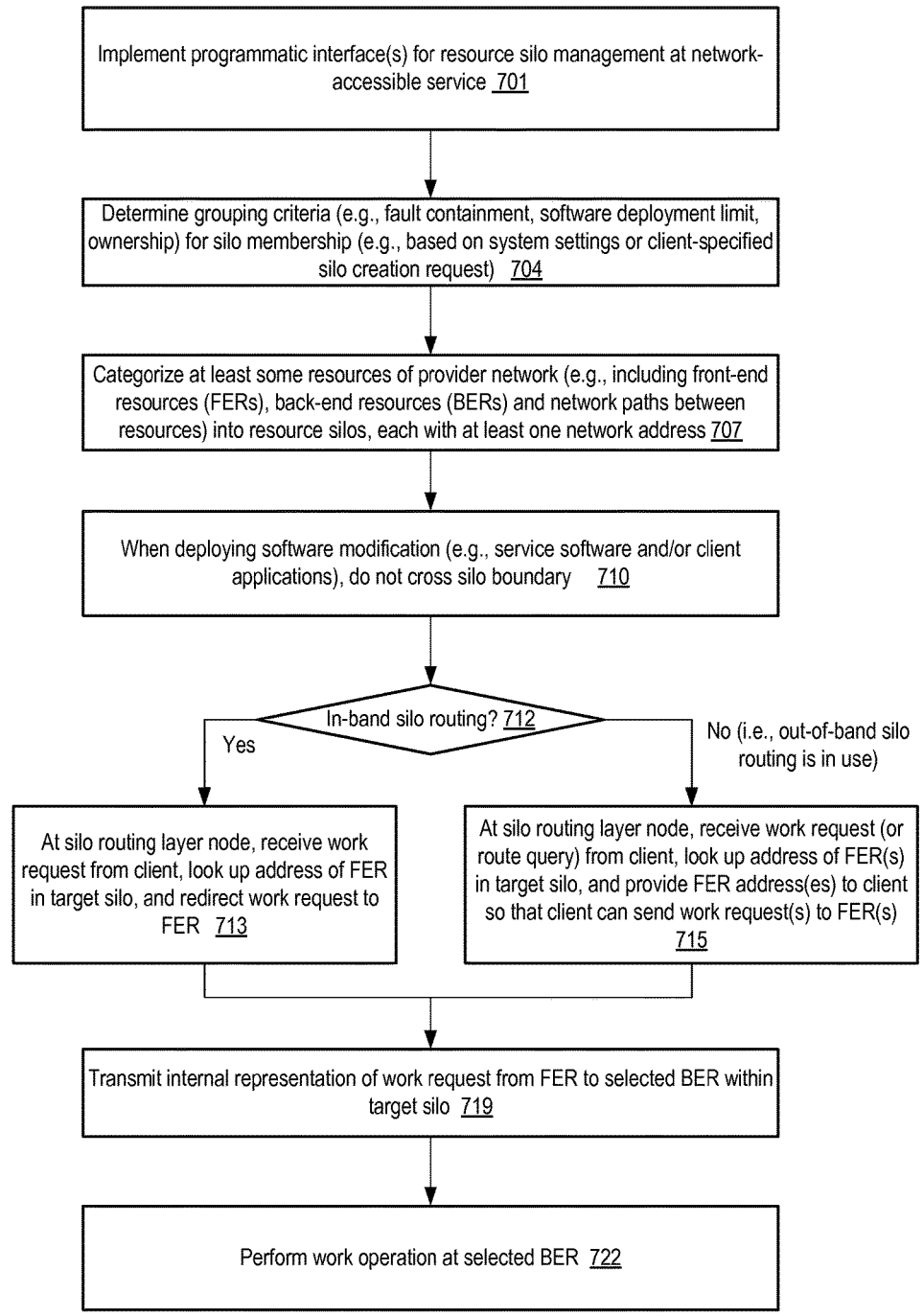
FIG. 7 is a flow diagram illustrating aspects of operations that may be performed to implement resource silos, according to at least some embodiments.

FIG. 7 is a flow diagram illustrating aspects of operations that may be performed to implement resource silos, according to at least some embodiments. As shown in element 701, one or more programmatic interfaces for various silo management operations (such as those illustrated in FIG. 8 and described below) may be implemented in the depicted embodiment. The interfaces may include, for example, one or more APIs (application programming interfaces), web pages or web sites, command-line tools, or graphical user interfaces.

For a given resource silo to be established, the silo manager 180 may determine the criteria to be used to categorize resources as members of the silo (element 704). For example, in some cases, the member resources may be identified on the basis of fault containment requirements—e.g., one or more rack groups with supporting infrastructure components (such as rack groups 510 of FIG. 5) may be selected at one or more data centers or availability containers for inclusion in a silo. In other cases, membership in a silo may be based on ownership of the resources—e.g., in one embodiment, all the resources required to store and access a particular database table or set of tables, owned by a particular client C1, may be included as members of a silo. In some embodiments, silo boundaries may be determined based on software deployment considerations—e.g., resources to which an alpha-test version of service or client code is to be deployed may be made members of one silo, while resources to which a beta-test version of the code is to be deployed may be made members of a different silo. In at least one embodiment, some number of resources may be included in a silo based on a connectivity requirement between FERs and the BERs—for example, enough FERs and/or BERs may be included to support transfers of up to X Megabytes/second between the front-end and back-end layers. In some embodiments, grouping criteria for silo membership may include connectivity requirements to clients as well as, or instead of, connectivity requirements between FERs and BERs. Various other factors, such as some of the other properties illustrated in FIG. 6, may be used as grouping criteria to determine silo membership in different embodiments. In some cases, such as for service-defined silos, the criteria may be based on default system settings, while in other scenarios, a client's silo establishment request may specify some or all of the silo membership criteria.

The silo manager 180 may categorize at least some resources of a provider network as members of the resource silo (element 707), e.g., based on the criteria determined in operations corresponding to element 704. In at least some embodiments, a given silo may include resources from several different layers of a service, such as front-end resources (similar to the request routers shown in FIG. 2), back-end resources (similar to the storage nodes shown in FIG. 2), and network paths linking resources of the different layers (e.g., a connection graph similar to those shown in FIG. 1). As indicated in FIG. 1 and FIG. 5, in at least some embodiments, a given resource silo's members may include resources from multiple availability containers, and/or from multiple data centers. A given resource silo may typically be configured with at least one network address—e.g., a network address of an FER to which work requests to be completed at the silo's BER(s) can be directed. A silo routing layer comprising, for example, one or more silo routing nodes configured to identify the target silo for a given work request may be notified of the address and the membership of the silo in some implementations.

Depending on the motivation for establishing the silo, in at least some embodiments, software deployments (such as upgrades to service software and/or client applications) may be implemented one silo at a time. That is, the modified or new software may be rolled out to the devices of a given silo at a time, in such a way that the silo boundary is not crossed by the software (element 710) and any errors that result from the new/modified software can only impact operations of that given silo, and not operations at other silos.

In the depicted embodiment, different operations may be performed at a silo routing layer node depending on whether in-band silo routing is being implemented, or out-of-band silo routing is being implemented. If in-band silo routing is being implemented, as determined in element 712, the silo routing layer node may be configured to receive a client work request targeted to the silo, look up an address of a selected FER of the silo, and redirect the client's work request to that FER (element 713). If out-of-band silo routing is being used, as also detected in element 712, the silo routing layer node may instead provide the network address(es) of one or more selected FERs of the silo to the client, allowing the client to transmit work requests to the selected FER(s). In some embodiments, clients may submit silo route queries (in addition to, or instead of, work requests) to silo routing layer nodes to determine the addresses of, or routes to, the appropriate FERs. Any of various approaches may be taken to identify the particular FER to which a given work resource is to be directed (either by the silo routing layer node, or by the client). For example, random selection may be used in some embodiments, while in other embodiments in which the work request indicates a particular portion of targeted client data, a content-based selection algorithm may be used according to which each FER is associated with a respective subset of client data.

When the selected FER receives the work request, one or more BERs may be selected, and an internal representation of the work request may be sent to the selected BERs, e.g., via a persistent network connection established for intra-silo communications (element 719). One or more work operations corresponding to the work request may be performed at the selected BER(s) (element 722). In some implementations, a response to the work request (e.g., indicating a result of the work) may be transmitted in the reverse direction, from the BER(s) back to the client via an FER.

It is noted that at least in some embodiments, not all the resources of a given service, data center, or provider network may be categorized as members of one or more silos; some resources may remain outside silos for at least part of their lifetime. In the case of an embodiment in which client-requested dedicated silos are supported, for example, some resources may be shared by multiple clients and may not be included in any client-requested dedicated silo.

Figure 8:
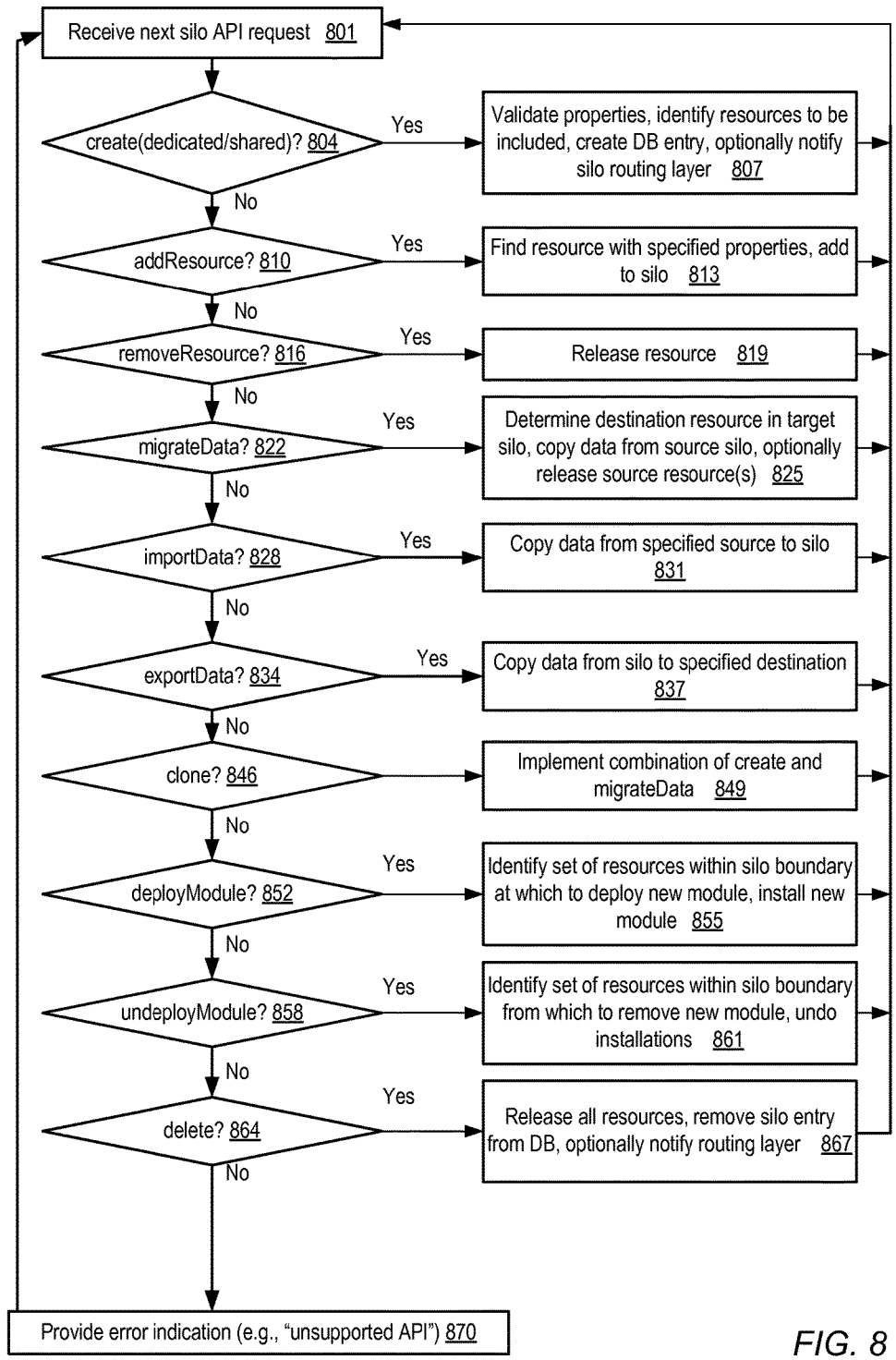
FIG. 8 is a flow diagram illustrating aspects of operations that may be performed in response to requests received via application programmatic interfaces for resource silos, according to at least some embodiments.

FIG. 8 is a flow diagram illustrating aspects of operations that may be performed in response to requests received via application programmatic interfaces for resource silos, according to at least some embodiments. As described above, one or more programmatic interfaces, such as APIs or web interfaces that result in API calls, may be set up in some embodiments for various types of silo management tasks. A client's request for a given silo management operation may be logically translated or converted into one or more of such API calls, which may be handled for example by the silo manager 180. When a silo API call is received at the silo manager (element 801 of FIG. 8), depending on the specific API call and its parameters, a set of operations may be initiated as follows in the depicted embodiment.

If a client requests the creation of either a dedicated or a shared (multi-client) silo (element 804), the silo manager 180 may determine and/or validate various configuration parameters of the silo, identify the specific resources to be designated as silo members, create a database entry for the newly created silo, and optionally notify the silo routing layer of the creation and the network address(es) of one or more FERs of the silo (element 807). Some of the silo configuration parameters (such as durability, budget limits, device types, a pre-release or production software version, or a maintenance window) may be specified in the creation request; others may be selected by the silo manager based on system defaults or based on analysis of the request. For example, if a silo creation request indicates a desired durability level for the silo and one or more contained fault types, the silo manager may search for servers and other devices that can support the desired durability level. In some cases the request to create a silo may include incompatible requirements—e.g., while the client may indicate that a desired durability level is to be supported, and may also indicate a budget limit, the silo manager may determine that the budget limit is insufficient for the desired durability level. In such cases, in at least some embodiments the silo manager may indicate the incompatibility to the client, and the client may modify the create request parameters. It is noted that at least in some embodiments, silo creation requests may be received from administrative components of various network-accessible service at the provider network—i.e., similar APIs may be used by internal components of the provider network as are made available to clients of the provider network services.

Respective APIs to add and remove resources from a given silo may be supported in at least some embodiments. As shown in elements 810 and 813, in response to a request to add a resource of a particular type (which may be generated, for example, by a client in anticipation of higher workloads), the silo manager may find a resource with the requested properties, and add it to the silo. When a request to remove a resource from the silo is received (as may occur when a client's workload is anticipated to decline) (element 816), the silo manager may release (e.g., free up for other purposes) the specified resource or a particular resource of the specified type (element 819).

In at least some embodiments in which the network-accessible service whose resources are grouped into silos is a storage-related service, an API to migrate data from a source silo (e.g., some set of BERs at the source silo) to a destination silo may be supported. In response to a request to migrate a specified set (or all) of a client's data from a source silos S1 to a destination silo S2 (element 822), in the depicted embodiment, operations similar to the following may be initiated, as shown in element 825. First, a target set of one or more resources (e.g., BERs) may be identified, or, if needed, instantiated in the destination silo. Then, the specified data set may be copied from the source silo to the target resources. Finally, the resources at which the data was stored in the source silo may be repurposed or released. In some embodiments, several flavors of migration, including migration without releasing the source resources, as well as migration accompanied by release of the source resources, may be supported. In one implementation, the resources themselves may be transported from the source silo to the destination silo, instead of copying the data.

In one embodiment, respective APIs to export or import the data stored in a given resource silo may be supported. Import and export functionality may be useful for (respectively) backup and restore purposes, for example. As shown in element 828, when a request to import data is received, data may be copied to the silo (e.g., to one or more back-end resources) from a specified source (element 831), such as a set of devices to which a backup copy was previously exported. If a request to export a silo's data is received (element 834), the data stored at the silo may be copied to a specified destination (element 837), such as a backup device or devices. In some embodiments, both partial (e.g., incremental) and full backups (and corresponding restores) of resource silo data may be supported.

According to one embodiment, an API to clone an existing silo may be supported. In response to a request to clone a silo (element 846), a combination of the operations corresponding to a create silo request and a migrate data request may be performed (e.g., without releasing the source resources) (element 849). Thus, after a silo S1 is cloned, a newly-created silo S2 with a copy of S1's data may be available for use. Cloning may be especially useful in software development environments, where for example a client may wish to quickly establish an alpha test environment similar to a development environment, or a beta test environment similar to an alpha test environment.

APIs to support deployment and un-deployment of software modules, a silo at a time, may be provided in some implementations. In response to receiving a request to deploy a software module (element 852) to a specified silo, the silo manager may determine the specific set of resources (e.g. BERs, FERs, or both, depending on the software module) at which the module should be installed or configured (element 855), and then install the module at those resources. For a an un-deploy request (element 858), the silo manager may identify which specific resources in the silo have the module installed, and uninstall the module from those resources (element 861). In response to a request to delete a silo (element 864), the silo manager may release the resources of the silo and remove any database entries that were earlier created for the silo (element 867). If an unsupported API call is received (element 870), an error message such as "unsupported API" may be generated. After handling a particular API call, the silo manager may address the next API call, as indicated by the arrow leading from elements 807, 813, etc. back to element 801.

It is noted that in various embodiments, operations other than those illustrated in the flow diagrams of FIG. 7 and FIG. 8 may be implemented to support resource silo management and use, and that some of the operations shown may not be implemented, or may be implemented in a different order or in parallel rather than sequentially. For example, the silo manager may be implemented as a multi-threaded entity, capable of handling several different silo management operations in parallel in some embodiments.

Use Cases

The techniques described above, of enabling service-defined and/or client-requested resource silos in the context of multi-layer, distributed network accessible services may be useful in a variety of different scenarios. For example, service-defined silos may be very useful in managing the faults and outages that inevitably occur in sophisticated provider networks implementing complex applications. The overall likelihood and frequency of outages may be reduced using resource silos set up for fault containment, and the mean time to recover from failures may also be reduced (since the impact of a given error or fault is reduced). Enabling clients to request the establishment of ownership-based silos may also help with customer satisfaction, in that the probability of malicious software attacks on client applications may be reduced, and clients may be provided greater control over resource allocation than may have been possible if shared resources were used.

Illustrative Computer System

Figure 9:
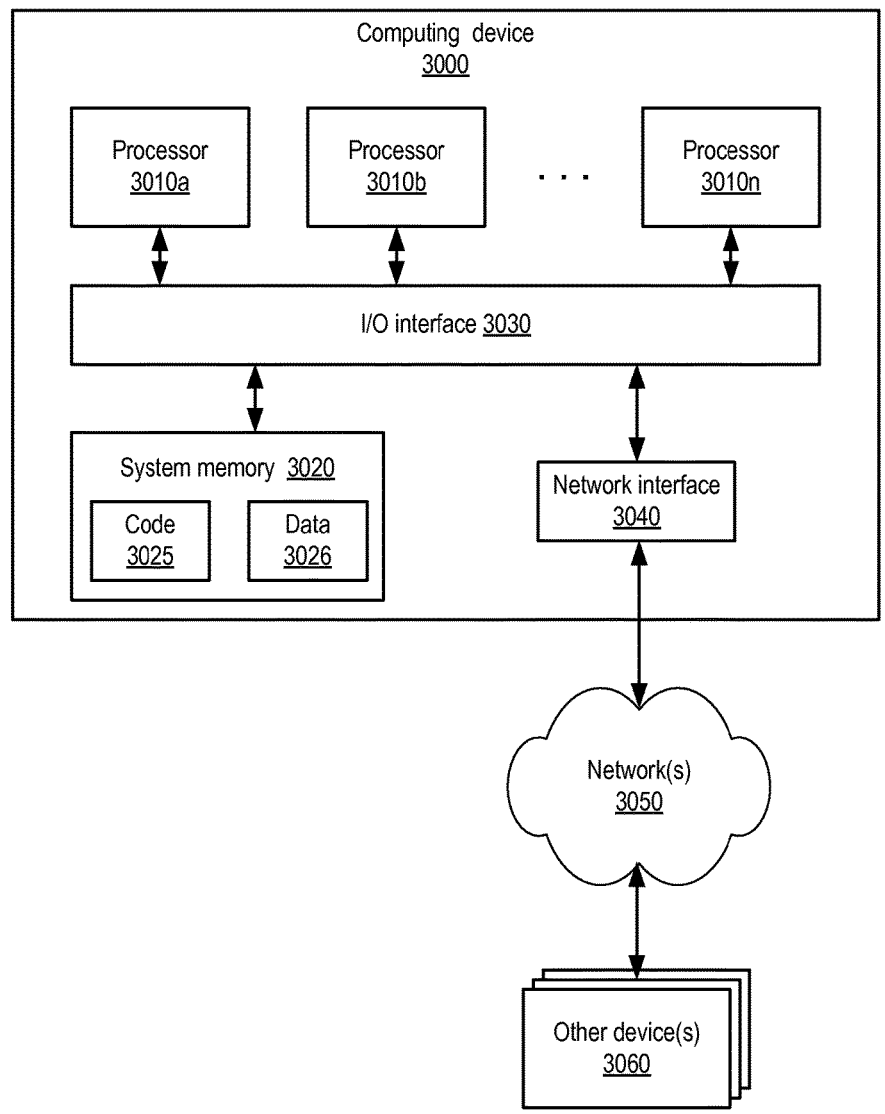
FIG. 9 is a block diagram illustrating an example computing device that may be used in at least some embodiments.

In at least some embodiments, a server that implements a portion or all of one or more of the technologies described herein, including the techniques to implement silo managers, silo routing layer nodes, front-end resources, and back-end resources, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
categorize a subset of resources of a network-accessible database service of a provider network as members of a first resource silo, the subset of resources including resources of the network-accessible database service to prevent an error condition of a specified error type from affecting other resources of the network-accessible database service that are not included in the subset of resources, wherein the specified error type is indicated in configuration properties of the first resource silo, wherein the provider network comprises a first data center and a second data center, wherein the network-accessible database service comprises a front-end layer of resources and a back-end layer of resources, wherein the subset of resources are allocated to a particular client entity, wherein the first resource silo comprises:
(a) at least one resource at the first data center and at least one resource at the second data center, wherein the at least one resource at the first data center has a failure profile that is not expected to be correlated with a failure profile of the at least one resource at the second data center, and
(b) at least a first resource from the front-end layer and at least a second resource from the back-end layer;
wherein another subset of resources of the network-accessible database service are shared resources allocated to one or more other client entities, the other subset of resources configured to remain outside one or more resource silos for at least a part of a lifetime of the shared resources, the one or more resource silos including the first resource silo;
identify, at a node of a silo routing layer, the first resource silo as the target resource silo at which at least a particular work operation associated with a client work request is to be performed;
transmit a representation of the client work request to the second resource from the first resource using a network connection configured for intra-silo traffic within the first resource silo; and
perform the particular work operation at the second resource.

2. The system as recited in claim 1, wherein the resources of the subset are categorized as members of the first resource silo based at least in part on a fault containment requirement, wherein, in accordance with the fault containment requirement, the error condition of the specified error type is to be prevented from impacting operations outside the first resource silo, and wherein the configuration properties of the first resource silo are stored within a silo database.

3. The system as recited in claim 2, wherein the specified error types include errors caused by one or more of: (a) deployment of a software module comprising a software fault, (b) hardware failure, (c) infrastructure outage, or (d) user error.

4. The system as recited in claim 1, wherein the resources of the subset are categorized as members of the first resource silo based on ownership, by the particular client entity, of data stored at a plurality of back-end layer resources.

5. The system as recited in claim 1, wherein the one or more computing devices are further configured to:
implement a programmatic interface enabling a set of silo management operations, wherein the set includes one or more of: (a) silo creation in response to a client request, (b) data migration from one resource silo to a different resource silo, (c) addition of a resource to a specified resource silo; (d) removal of a resource from a specified resource silo; (e) software deployment within a specified resource silo; (f) data export from a specified resource silo; or (g) data import to a specified resource silo.

6. A method, comprising:
performing, by one or more computing devices:
categorizing a subset of resources used to implement a network-accessible database service of a provider network as members of a first resource silo, the subset of resources including resources used to implement the network-accessible database service to prevent an error condition of a specified error type from affecting other resources of the provider network that are not included in the subset of resources, wherein the specified error type is indicated in configuration properties of the first resource silo, wherein the network-accessible database service comprises a front-end layer of resources and a back-end layer of resources, wherein the first resource silo comprises at least a first resource from the front-end layer and at least a second resource from the back-end layer, wherein the first resource silo comprises at least one resource from a first availability container and a second resource from a second availability container, and wherein the first availability container has a failure profile that is not expected to be correlated with a failure profile of the second availability container, and wherein the subset of resources are allocated to a particular client entity;
wherein another subset of resources of the network-accessible database service are shared resources allocated to one or more other client entities, the other subset of resources configured to remain outside one or more resource silos for at least a part of a lifetime of the shared resources, the one or more resource silos including the first resource silo;
identifying, at a node of a silo routing layer, the first resource silo as the target resource silo at which at least a particular work operation associated with a work request is to be performed;
transmitting a representation of the work request to the second resource from the first resource using a network connection configured for intra-silo traffic within the first resource silo; and
performing the particular work operation at the second resource.

7. The method as recited in claim 6, wherein the resources of the subset are categorized as members of the first resource silo based at least in part on a fault containment requirement, wherein, in accordance with the fault containment requirement, the error condition of the specified error type is to be prevented from impacting operations outside the first resource silo.

8. The method as recited in claim 7, wherein the specified error types include errors caused by one or more of: (a)

deployment of a software module comprising a software fault, (b) hardware failure, (c) infrastructure outage, or (d) user error.

9. The method as recited in claim 6, wherein the resources of the subset are categorized as members of the first resource silo based on ownership, by the particular client entity, of data stored at a plurality of back-end layer resources.

10. The method as recited in claim 6, wherein the resources of the subset are categorized as members of the first resource silo based at least in part on a connectivity requirement between one or more front-end resources of the subset and one or more back-end resources of the subset, in which the connectivity requirement specifies a throughput of transfers between the front-end layer and the back-end layer supported by the one or more front-end resources of the subset and one or more back-end resources of the subset.

11. The method as recited in claim 6, further comprising performing, by the one or more computing devices:
implementing a programmatic interface enabling a set of silo management operations, wherein the set includes one or more of: (a) silo creation in response to a client request, (b) data migration from one resource silo to a different resource silo, (c) addition of a resource to a specified resource silo; (d) removal of a resource from a specified resource silo; (e) software deployment within a specified resource silo; (f) data export from a specified resource silo; or (g) data import to a specified resource silo.

12. The method as recited in claim 11, wherein the client request to create a particular resource silo comprises an indication of one or more of: (a) a durability requirement associated with the particular silo, (b) a client budget limit, (c) a desired type of storage device, (d) a pre-release software version to be used at the particular silo, or (e) a maintenance window requirement associated with the particular silo.

13. The method as recited in claim 6, further comprising performing, by the one or more computing devices:
determining to migrate at least a portion of client data from the second resource of the first resource silo to a different resource silo of the network-accessible database service;
identifying a particular resource within the different resource silo as a destination for the at least a portion of client data;
copying the at least a portion of the client data from the second resource of the first resource silo to the particular resource; and
repurposing the second resource.

14. The method as recited in claim 6, wherein the network-accessible database service comprises a provisioned-throughput database service.

15. A non-transitory computer-accessible storage medium storing program instructions that when executed on one or more processors:
categorize a subset of resources used to implement a network-accessible database service of a provider network as members of a first resource silo, the subset of resources including resources used to implement the network-accessible database service to prevent an error condition of a specified error type from affecting other resources of the provider network that are not included in the subset of resources, wherein the specified error type is indicated in configuration properties of the first resource silo, wherein the subset of resources are allocated to a particular client entity, wherein the network-accessible database service comprises one or more resources at a first data center and one or more resources at a second data center, wherein the first resource silo comprises at least a first resource from the first data center and at least a second resource from the second data center, wherein the at least a first resource from the first data center has a failure profile that is not expected to be correlated with a failure profile of the at least a second resource from the second data center;
wherein another subset of resources of the network-accessible database service are shared resources allocated to one or more other client entities, the other subset of resources configured to remain outside one or more resource silos for at least a part of a lifetime of the shared resources, the one or more resource silos including the first resource silo;
identify, at a node of a silo routing layer, the first resource silo as the target resource silo at which at least a particular work operation associated with a work request is to be performed; and
initiate a transmission of a representation of the work request to a selected back-end resource of the first resource silo from the first resource using a network connection configured for intra-silo traffic within the first resource silo wherein the particular work operation is performed at the selected back-end resource.

16. The non-transitory computer-accessible storage medium as recited in claim 15, wherein the resources of the subset are categorized as members of the first resource silo based at least in part on a fault containment requirement, wherein, in accordance with the fault containment requirement, the error condition of the specified error type is to be prevented from impacting operations outside the first resource silo.

17. The non-transitory computer-accessible storage medium as recited in claim 15, wherein the resources of the subset are categorized as members of the first resource silo based on ownership of data stored at a plurality of back-end layer resources by the particular client entity.

18. The non-transitory computer-accessible storage medium as recited in claim 15, wherein the first data center and the second data center each comprise a plurality of rooms, wherein each room of the plurality of rooms comprises a plurality of rack groups, wherein each rack group of the plurality of rack groups comprises a plurality of server racks and a respective set of independently managed infrastructure components comprising at least a power infrastructure component, a cooling infrastructure component, and a networking infrastructure component, and wherein the resources of the subset comprise at least one rack group of the first data center and at least one rack group of the second data center.

19. The non-transitory computer-accessible storage medium as recited in claim 15, wherein the network-accessible database service comprises a provisioned-throughput database service.

20. A method, comprising:
performing, by one or more computing devices:
implementing a programmatic interface enabling a client of a multi-tenant network-accessible data storage service of a provider network to submit a request to establish a dedicated resource silo on behalf of the client, wherein the service comprises a back-end resource layer including one or more resources configured to store client data, and a front-end resource layer comprising one or more resources configured to transmit representations of client work requests to the back-end layer, wherein the dedicated resource silo comprises at least one resource from a first availability container and at least one resource from a second availability container, wherein the dedicated resource silo comprises resources of the multi-tenant network-accessible data storage service to prevent an error condition of a specified error type from affecting other resources of the provider network that are not included in the dedicated resource silo, wherein the specified error type is indicated in configuration properties of the dedicated resource silo, and wherein the first availability container has a failure profile that is not expected to be correlated with a failure profile of the second availability container;

receiving, via the programmatic interface, a request to establish the dedicated resource silo on behalf of a particular client;

configuring at least a first resource of the front-end layer and at least a second resource of the back-end layer as members of the dedicated resource silo for use by the particular client;

configuring at least a third resource of the front-end layer and at least a fourth resource of the back-end layer for shared use by a plurality of other clients, wherein the at least the third resource of the front-end layer and the at least the fourth resource of the back-end layer are further configured to remain outside one or more resource silos for at least a part of a lifetime of the shared use; and directing a work request received from the client to the first resource.

* * * * *